Nov. 12, 1929.　　E. F. WALSH ET AL　　1,735,066
AUTOMATIC DUMPING BODY FOR MOTOR VEHICLES
Filed April 9, 1925　　4 Sheets-Sheet 4
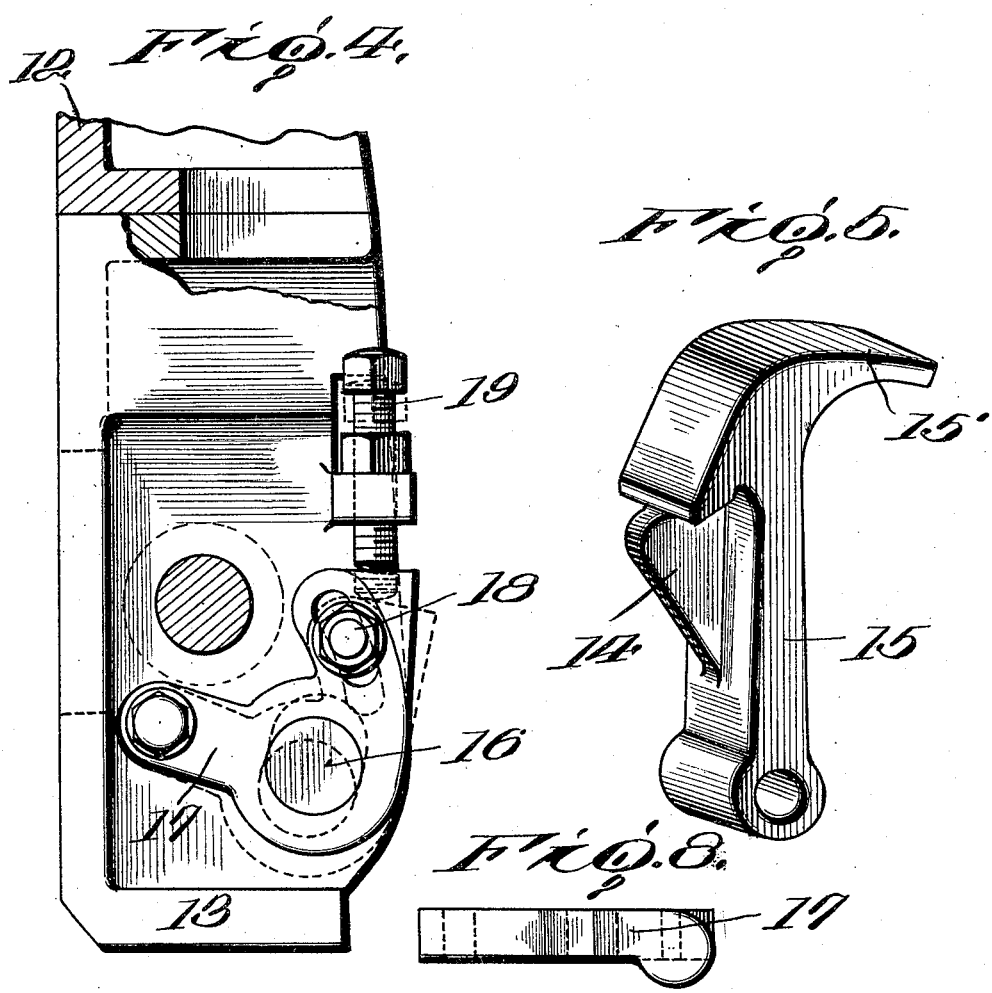
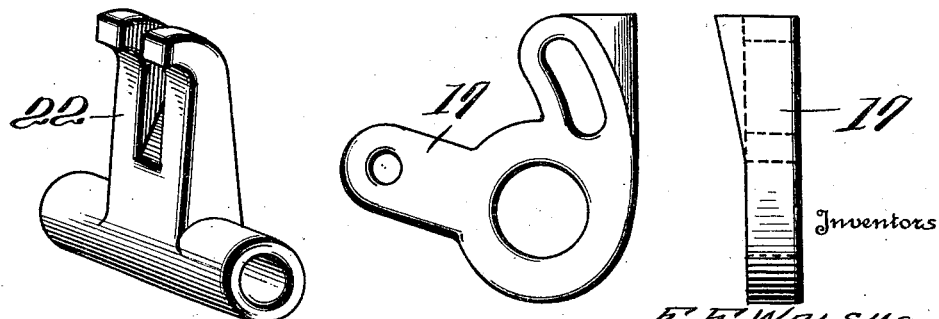
Inventors
E. F. Walsh and
W. E. Foust
By
Attorney Patented Nov. 12, 1929

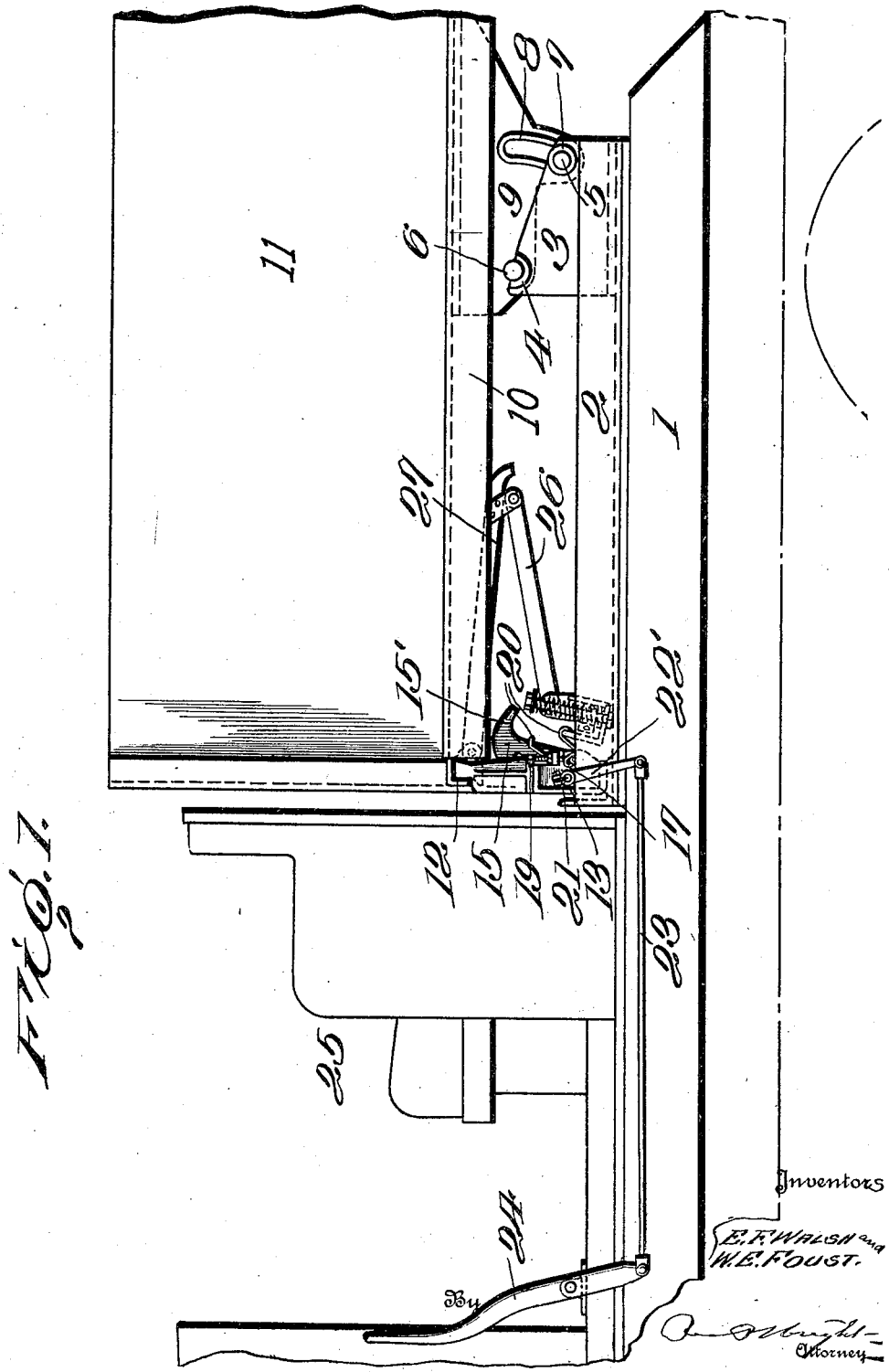

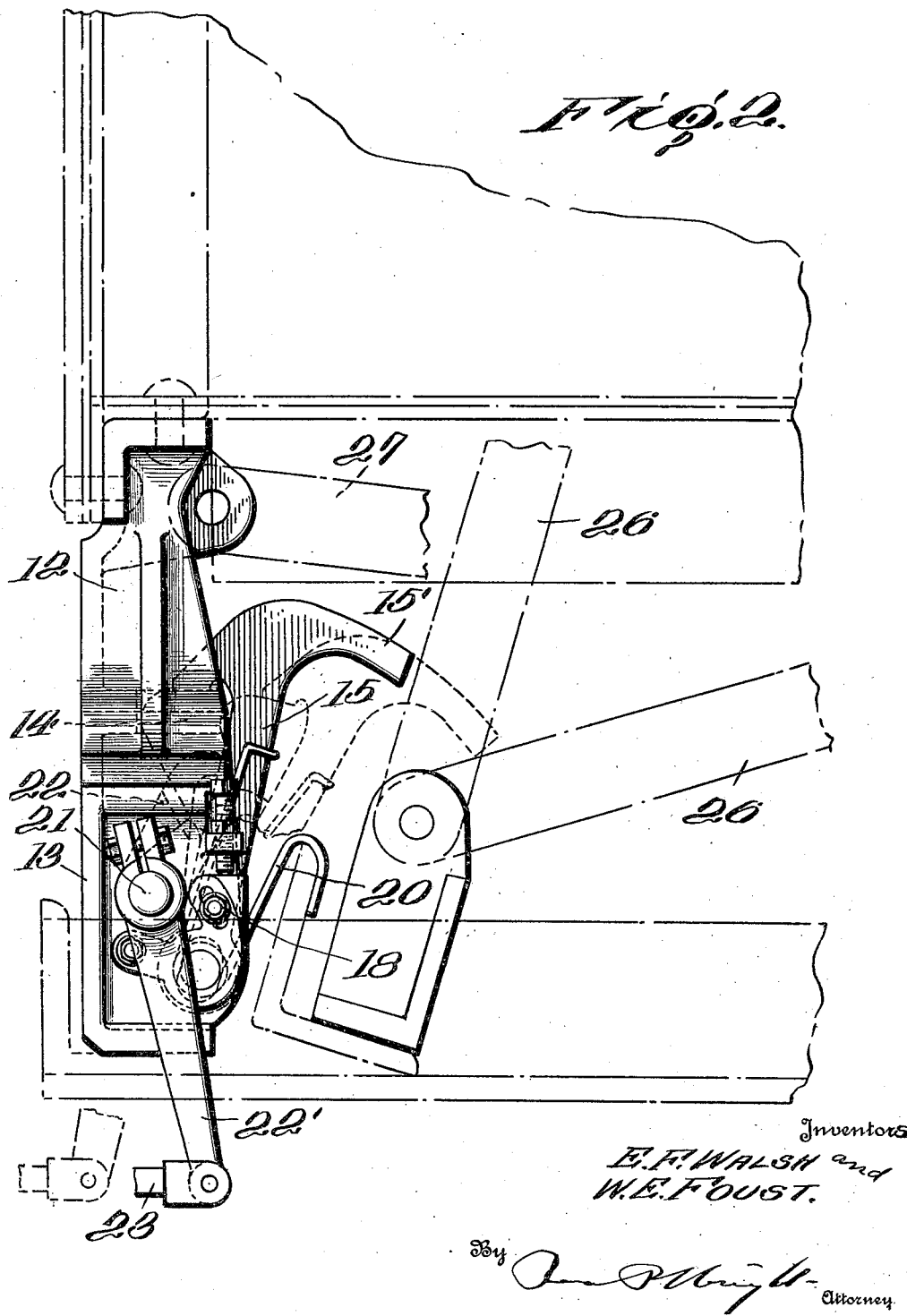

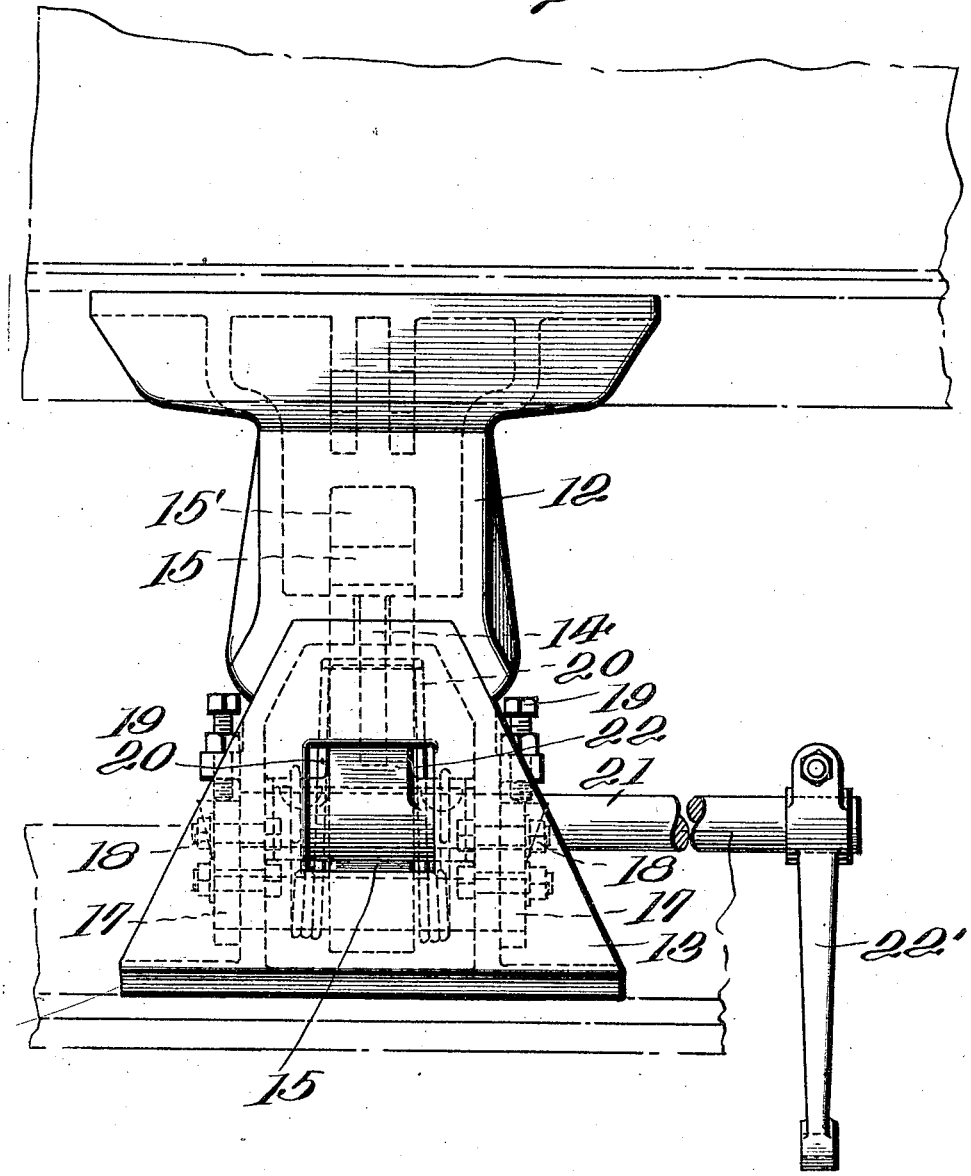

1,735,066

UNITED STATES PATENT OFFICE

EDWARD F. WALSH AND WILLIAM E. FOUST, OF MARION, INDIANA

AUTOMATIC DUMPING BODY FOR MOTOR VEHICLES

Application filed April 9, 1925. Serial No. 21,912.

This invention relates to certain new and useful improvements in automatic dumping bodies for motor vehicles and more particularly to an under-body support and latch for a self-dumping body and is an improvement on our application filed January 28, 1925, Serial Number 5,341, the object being to provide a construction of dumping body which enables the body to be placed closer to the cab than with most constructions now in use and to provide means for holding the body in a horizontal position in such a manner that it can be released from the interior of the cab.

Another and further object of the invention is to provide the body with a pair of supporting members, one of which is carried by the body and the other by the sub-frame, whereby the forward end is supported rigidly, the lower body supporting member being provided with a pivoted latch mounted in an adjustable bearing so as to compensate for wear, the latch being operated by a cam carried by a shaft connected to a hand lever arranged within the cab.

A further object of the invention is to provide the upper and lower body support with aligning slots through which the web of the latch extends so as to keep the body in alignment.

Other and further objects and advantages of the invention will be hereinafter set forth and the novel features thereof defined by the appended claims.

In the drawings,

Figure 1 is a side elevation of a portion of a motor truck having a dumping body constructed in accordance with our invention;

Figure 2 is a detail enlarged side elevation of the upper and lower supports showing the latch in locked position in full lines and swung rearwardly in dotted lines so as to break the stiff leg;

Figure 3 is a detail elevation of the upper and lower supports showing the latch, adjustable bearings, operating shaft and cam in dotted lines;

Figure 4 is a detail view of the lower body support showing the adjustable bearing for the latch shaft;

Figure 5 is a perspective view of the latch detached;

Figure 6 is a perspective view of the cam detached for operating the latch;

Figure 7 is a side elevation with an adjustable support;

Figure 8 is a plan view of the same; and

Figure 9 is a detached view of the same.

In the drawings 1 indicates a chassis of a motor truck on which is arranged a sub-frame 2 preferably formed of angle irons and secured rigidly on the chassis by any suitable means, such as bolts and the like.

Secured between the side bars of the sub-frame 2 at the rear end are upwardly extending bearings 3 having semi-circular bearings 4 and circular bearings 5 in which are arranged transversely extending shafts 6 and 7, shaft 6 extending through a circular bearing formed in depending bearing member 9 arranged between the longitudinally disposed sills 10 of a metal body 11, the construction of bearing and manner of connecting the same being substantially the same as shown in the above-referred to application. The shaft 7 extends through a slot 8 formed in the bearing member 9 and these two shafts form a pair of spaced fulcrums for the body to rock on in order to allow it to dump its load and return to a horizontal position automatically.

Secured to the forward end of the metal body 11 is a casting 12 forming the upper body support and is adapted to rest on the top of a casting 13 forming the lower body support which is mounted on the sub-frame 2 of the motor truck so as to form a rigid support for the forward end of the body in order to support its load.

The casting 13 is preferably formed of pyramid shape having its apex cut off squarely and is adapted to be embraced by a corresponding shaped portion of the casting 12, the two abutting horizontal portions of the casting being slotted as shown through which is adapted to extend the web portion 14 of a latch 15 which engages the upper casting so as to lock the body in horizontal position. By forming the upper and lower supports in this manner in connection with a pivoted latch 15 constructed as clearly shown and described, the body is maintained in alignment and a rigid hand latch is formed so as to securely fasten the body. The latch 15 is carried by a shaft 16 which is mounted in pivoted bearings 17 so they can be adjusted to take up wear of the latch, the pivoted bearings 17 are provided with slotted portions through which bolts 18 extend carrying nuts for locking the bearings in their adjusted position. The upward movement of the bearing is locked by set screws 19 and by the two adjustments, the bolts 18 and the set screws 19, the bearings can be adjusted and locked in their adjusted position so that all danger of the same moving is prevented.

The latch is normally held forwardly by a spring 20 and by the particular construction of web and latch, the latch yields so as to allow the body to return to horizontal position and be fastened automatically.

Mounted in suitable bearings formed in the lower body support 13 is a shaft 21 on which is keyed a cam 22 which is bifurcated to receive the web 14 of the latch 15 and is adapted to force the latch out of engagement with the upper support and release the body and allow the same to dump its load automatically.

The shaft 21 is provided with a lever 22' which has connected thereto a rod 23 extending forwardly and having its forward end connected to the lower end of a hand lever 24 mounted in the cab 25 of the motor truck so that the latch can be released from the interior of the cab.

Disposed under the forward end of the body is a stiff leg formed of sections 26 and 27 connecting the body to the sub-frame, the construction of stiff leg being substantially as shown in the above-referred to application and supports the body in a tilted position, the connection of the lower section of the stiff leg to the sub-frame being such as to allow the same to yield to reduce the shock and the particular construction of stiff leg forms no part of this invention.

The latch 15 is provided with a tail portion 15' which is adapted to engage the lower section 26 of the stiff leg so as to break the stiff leg when it is desired to allow the body to return to a horizontal position after the load has been dumped. This is accomplished by pulling rearwardly on the hand lever 24 so as to force the latch backwardly into engagement with the lower section of the stiff leg.

From the foregoing description it will be seen that we have provided an under-body support and latch for an automatic dumping body for motor trucks which is so constructed that the load and the body is supported rigidly on a pair of supporting members which interlock when in engagement with one another and which are so arranged that the body of the motor truck can be placed close against the cab of the motor truck and the latch carried by one of the supports operated from the interior of the cab. The construction of latch and manner of operating the same provides means for allowing the latch independent movement of its operating means so as to insure positive operation of the same. By having the pivoted latch mounted on a shaft arranged in adjustable bearings, the latch can be adjusted in respect to the upper support so as to insure positive locking action at all times.

The upper support is provided with a bearing for the upper section of the stiff leg so that all of the parts are arranged in a compact manner and an exceedingly novel form of support for the rear end of the tilting body of a motor truck is provided.

What we claim is:—

1. The combination with a motor truck having a chassis, of a body pivotally mounted upon said chassis, a stiff leg connecting said body to said chassis formed of a pair of pivotally connected sections, a support carried by said chassis, a support carried by said body adapted to engage the first mentioned support, a pivoted latch carried by the support of the chassis and adapted to engage the support of the body for locking said body in horizontal position, means for moving said latch out of engagement with said support, said latch being adapted to engage one of the sections of said stiff leg for breaking said stiff leg to allow said body to move into horizontal position.

2. The combination with a motor truck having a chassis, of a body pivotally mounted thereon, a pair of supports carried respectively by said body and said chassis having oppositely disposed inclined contacting faces, said supports being adapted to interlock with one another for supporting the forward end of said body, a pivoted latch carried by the lower support adapted to engage the upper support, a cam for engaging said latch and a hand lever having a connection with said cam for moving said cam into engagement with said latch to disengage said latch from said support.

3. The combination with a motor vehicle having a pivotally mounted body, of a pair of supports carried respectively by said motor vehicle and said body having inclined contacting faces for supporting the forward end of said body, one of said supports being provided with a pivoted latch, a spring for holding said latch in position to engage the other support, a rock shaft carrying a cam to engage said latch, a lever for rocking said shaft, a hand lever and a link connecting said hand lever to said lever.

4. The combination with a motor vehicle having a chassis, of a sub-frame mounted upon said chassis, a body pivotally mounted upon said sub-frame, adapted to move into an inclined position automatically when loaded and into a horizontal positon when unloaded, a sectional stiff leg for holding said body in an inclined position, a pair of interlocking supports carried respectively by said body and said sub-frame, a pivoted spring-actuated latch carried by the lower support adapted to engage the upper support for holding said body in a horizontal position, said pivoted latch being adapted to engage one of the sections of said stiff leg to break said stiff leg to allow said body to return to horizontal position and means for actuating said latch.

5. An under-body support for motor trucks comprising a pair of castings having abutting horizontal portions provided with registering slots and a latch having a web portion adapted to extend into said slots, said latch being arranged to engage one of said supports for locking said body in horizontal position.

6. The combination with a motor vehicle having a chassis, of a sub-frame carried by said chassis having a pivotally mounted body arranged thereon, a support carried by the forward end of said sub-frame having a horizontal portion, a support carried by the forward end of said body having a horizontal portion adapted to engage the horizontal portion of the first mentioned support and provided with portions embracing the first mentioned support, said horizontal portions being provided with registering slots, a pivoted spring-actuated latch carried by the support of said sub-frame having a web portion extending through said slots and means for operating said latch.

7. The combination with a motor vehicle having a chassis, a pivoted body mounted on said chassis, under-body supports for said body having interlocking portions, a stiff leg connecting said body to said chassis for supporting said body in an inclined position and a pivoted latch carried by one of said supports adapted to engage the other support for holding said body in horizontal position, said latch being mounted to engage said stiff leg to break said stiff leg to allow said body to return to a horizontal position.

8. A motor vehicle having a pivotally mounted body provided with supports carried respectively by the vehicle and the body at their forward ends, one of said supports being provided with adjustable bearings, a shaft mounted in said bearings and a pivoted spring-actuated latch carried by said shaft adapted to engage the support of said body for holding said body in a horizontal position.

9. The combination with a motor vehicle having a pivotally mounted body arranged to automatically move into an inclined position when released and back into a horizontal position after it has discharged its load, a pair of interlocking supports carried respectively by said vehicle and said body, adjustably mounted bearing members carried by the lower support, a shaft mounted in said bearings, a spring-actuated latch carried by said shaft and a cam arranged to engage said latch to release said body.

10. The combination with a motor vehicle having a chassis, of a body pivotally mounted thereon, a support carried by the forward end of said chassis, a support carried by the forward end of said body adapted to engage the first mentioned support when the body is in a horizontal position, said supports having inclined contacting faces, said supports being provided with abutting slotted portions, a pivoted latch carried by the lower support having a web portion adapted to extend into said slotted portions and manual means for operating said latch.

In testimony whereof we hereunto affix our signatures.

EDWARD F. WALSH.
WILLIAM E. FOUST.